United States Patent
Stack et al.

(10) Patent No.: US 6,864,779 B2
(45) Date of Patent: Mar. 8, 2005

(54) METHOD AND APPARATUS FOR TRANSMITTING DATA FROM A REMOTE LOCATION TO A DESIRED DEVICE

(75) Inventors: Brian T. Stack, Miami Lakes, FL (US); Frederick G. Wade, Wellington, FL (US); Roger L. Smeds, Stuart, FL (US)

(73) Assignee: E-NETPIC.COM, Inc., West Palm Beach, FL (US)

( * ) Notice: Subject to any disclaimer, the term of this patent is extended or adjusted under 35 U.S.C. 154(b) by 414 days.

(21) Appl. No.: 09/984,648

(22) Filed: Oct. 30, 2001

(65) Prior Publication Data

US 2003/0001720 A1 Jan. 2, 2003

Related U.S. Application Data (60) Provisional application No. 60/293,975, filed on May 30, 2001.

(51) Int. Cl.[7] .............................................. G05B 23/02
(52) U.S. Cl. ...................... 340/3.5; 340/506; 340/517; 340/539.1; 340/825.69; 340/825.72; 340/825.52; 713/176
(58) Field of Search .................... 340/3.5, 506, 517, 340/539.1, 539.11, 825.69, 825.72, 825.52, 825.53; 700/23; 711/204; 725/19, 30; 713/176, 180, 186, 179, 185; 380/246

(56) References Cited

U.S. PATENT DOCUMENTS

| | | | | |
|---|---|---|---|---|
| 5,432,871 A | * | 7/1995 | Novik | 382/232 |
| 5,806,005 A | | 9/1998 | Hull et al. | |
| 6,133,847 A | * | 10/2000 | Yang | 340/825.22 |
| 6,211,782 B1 | * | 4/2001 | Sandelman et al. | 340/506 |
| 6,480,753 B1 | * | 11/2002 | Calder et al. | 700/83 |
| 6,496,927 B1 | * | 12/2002 | McGrane et al. | 713/1 |

* cited by examiner

*Primary Examiner*—Michael Horabik
*Assistant Examiner*—Vernal Brown
(74) *Attorney, Agent, or Firm*—Jon A. Gibbons; Fleit, Kain, Gibbons, Gutman, Bongini & Bianco P.L.; Stuart J. Friedman (57) ABSTRACT

A method for transmitting data from a remote location for evaluation by an expert. A remote appliance couples a data collection device with a communications device to transmit collected data and serve as a virtual remote presence server. The remote appliance transmit collected data. The remote appliance transmits the data in accordance with subscriber information stored in a centralized device. The data can be processed or evaluated in any manner.

21 Claims, 5 Drawing Sheets

METHOD AND APPARATUS FOR TRANSMITTING DATA FROM A REMOTE LOCATION TO A DESIRED DEVICE

BACKGROUND

The invention relates generally to data transmission and more specifically to a method and system for transmitting data from a remote location to a desired device with predetermined transmission parameters.

There are many situations in which it is desirable to transmit data from a remote location in a predetermined manner. For example, when a decision maker, i.e. an expert, requires visual information from a remote worksite to render an informed decision. One such situation relates to parts replacement. Many part suppliers possess the information for rendering decisions related to parts that are part of a larger machinery or other apparatus. It is often inefficient to bring supplier personnel to the worksite or to take the machinery to the supplier. For example, in the case of the plumbing industry, the conventional practice is to send a plumber to a worksite to ascertain the location of a problem. If a damaged part is located, the plumber will often have to remove the damaged part and take it to a plumbing supplier to identify the part, determine its price, and order the part. Of course, this requires a great deal of time and thus is expensive. Further, it often requires that the affected portion of the plumbing system be shut off for an extended period while the damaged part is transported to the supplier location and identified. Similar situations arise in the repair of various machinery and systems.

Additionally, it is often desirable to transmit data from a remote location to a desired device, or plural devices, in a predetermined manner and under predetermined conditions. Further, depending on the transmittal data, it is often desirable to provide return data or control signals to remote devices to remedy a situation or other wise control actions at the remote location.

It is of course known to take photographs as visual information to assist a decision maker located at a remote location. However, the use of conventional photography still requires transportation of the photograph. Further, if additional visual information is required, additional photographs must be taken and transported. Some of the limitations of the use of conventional photography have been addressed by electronic devices such as teleconferencing systems, digital photography and the use of electronic mail (email), and other recent communications technology. U.S. Pat. No. 5,806,005 discloses an image transfer system which captures images in a portable camera and sends the images to a computer memory over a wireless connection. However, the system disclosed in U.S. Pat. No. 5,806,005 merely directs image data to another node and requires that the recipient device be identified and located manually, such as by entering a phone number or an email address.

Known systems require an expert reviewer to be available at a predesignated computer terminal or teleconferencing center or the like and require a great deal of configuration to direct the visual data to the proper location for viewing by the expert. Also, known systems fail to provide a flexible information delivery system that can be delivered as a service to various subscribers and controlled in a dynamic manner from a central device or various distributed devices. Finally, known systems merely expedite the delivery of visual data but do not aid in the decision making process, control decision making activity, or leverage the collection of visual data or the decisions made thereon.

SUMMARY OF THE INVENTION

It is an object of the invention to provide a virtual presence at remote locations. To achieve this object and other objects, a first aspect of the invention is a method for transmitting data from a remote location to a designated device. The method comprises recording subscriber information indicating the identity of a subscriber, one or more remote appliances associated the subscriber, and the characteristics of data transfer desired by the subscriber, collecting data at the remote location, transferring the data to a remote appliance, identifying the subscriber information corresponding to the remote appliance and transmitting the data to the device based on the subscriber information.

A second aspect of the invention is an appliance for transmitting data from a remote location to a designated device. The appliance comprises means for reading subscriber information indicating the identity of a subscriber associated with the remote appliance and the characteristics of data transfer desired by the subscriber, means for identifying a data collection device at the remote location, means for receiving data from the data collection device, and means for transmitting the data to the device based on the subscriber information.

BRIEF DESCRIPTION OF THE DRAWING

The invention will be described through a preferred embodiment and the attached drawing in which.

DETAILED DESCRIPTION

Figure 1:
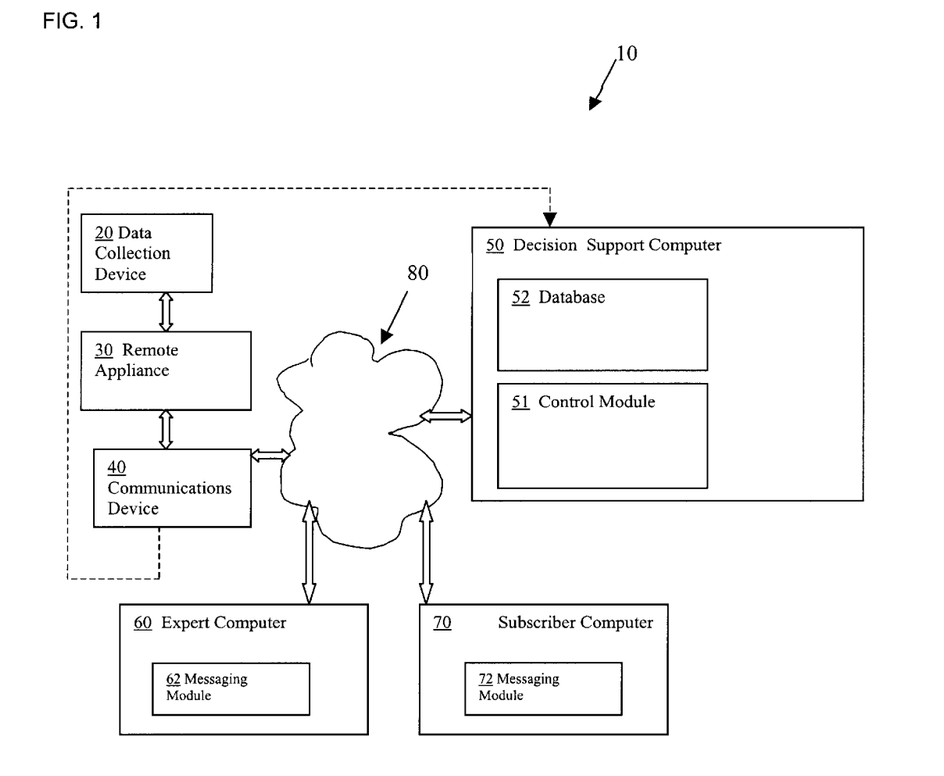
FIG. 1 is a block diagram of the computer architecture of the preferred embodiment.

FIG. 1 illustrates a computer architecture 10 for a virtual remote presence server of the preferred embodiment of the invention. A remote device, consisting of data collection device 20, remote appliance 30, and communications device 40, is coupled to decision support computer 50, expert computer 60, and subscriber computer 70 through communications channels. In the preferred embodiment, the communications channels are the Internet 80.

Remote appliance 30 is a portable, preferably hand-held, device that provides an interface between data collection device 20 and communications device 40. Local appliance 30 also provides logic to control the flow of data from data collection device 20 to other devices, such as HTTP servers, as described below. In the preferred embodiment, data collection device 20 is a conventional digital still or video camera, or any other device capable of capturing image data. Remote appliance 30 can communicate with data collection device 20 through any communications port on data collection device 20, such as a universal serial bus (USB) port, a proprietary port for a download cradle, or the like. Communications device 40 can be a conventional cellular phone, personal communication system (PCS) phone, a modem, or any other type of communications device having a data port through which local appliance 30 can input data for transfer. Preferably, communications device 40 provides wireless data transfer. Communications device 40 can be HTTP compliant and capable of placing data packets onto the Internet 80 directly (via an Internet service provider (ISP)) or it can be coupled directly to decision support computer 50 as indicated by the dashed line in FIG. 1.

Remote appliance 30 is capable of recognizing the type of data collection device 20 automatically by monitoring the output "signature" of the port of data collection device 20. For example, the output signature of a plurality of known data collection devices can be stored in a memory of remote appliance 30 as a lookup table or database. Interface protocols and drivers can be associated with each signature and loaded upon detection of the signature, in the manner described below, to automatically establish communications between data collection device 20 and remote appliance 30. Further, remote appliance 30 can be addressable over the Internet 80, i.e. have its own IP address, to permit control of data collection device 20 from a remote device coupled to the Internet 80, such as expert computer 60.

Decision support computer 50 can be an HTTP server, i.e. a Web server, and communicates with remote appliance 30 over the Internet 80 or directly, such as by modem to modem communication, as described above. Decision support computer 50 is associated with a decision support service provider and includes database 52 having profile information for each remote appliance 30 in the decision support service. Records stored in database 52 include subscriber information, such as the name and address of a subscriber to a decision support service, subscriber login information, such as a login ID and password, a unique ID of a particular local appliance(s) 30 associated with the subscriber, and information relating to the handling of communications from the particular local appliance(s) 30 as described in greater detail below. Decision support computer 50 also maintains an appliance control program which can be downloaded to remote appliance 30 on the fly to insure that the latest version thereof is always used to control the transfer of information from data collection device 20 and remote appliance 30 as described in greater detail below.

Figure 2:
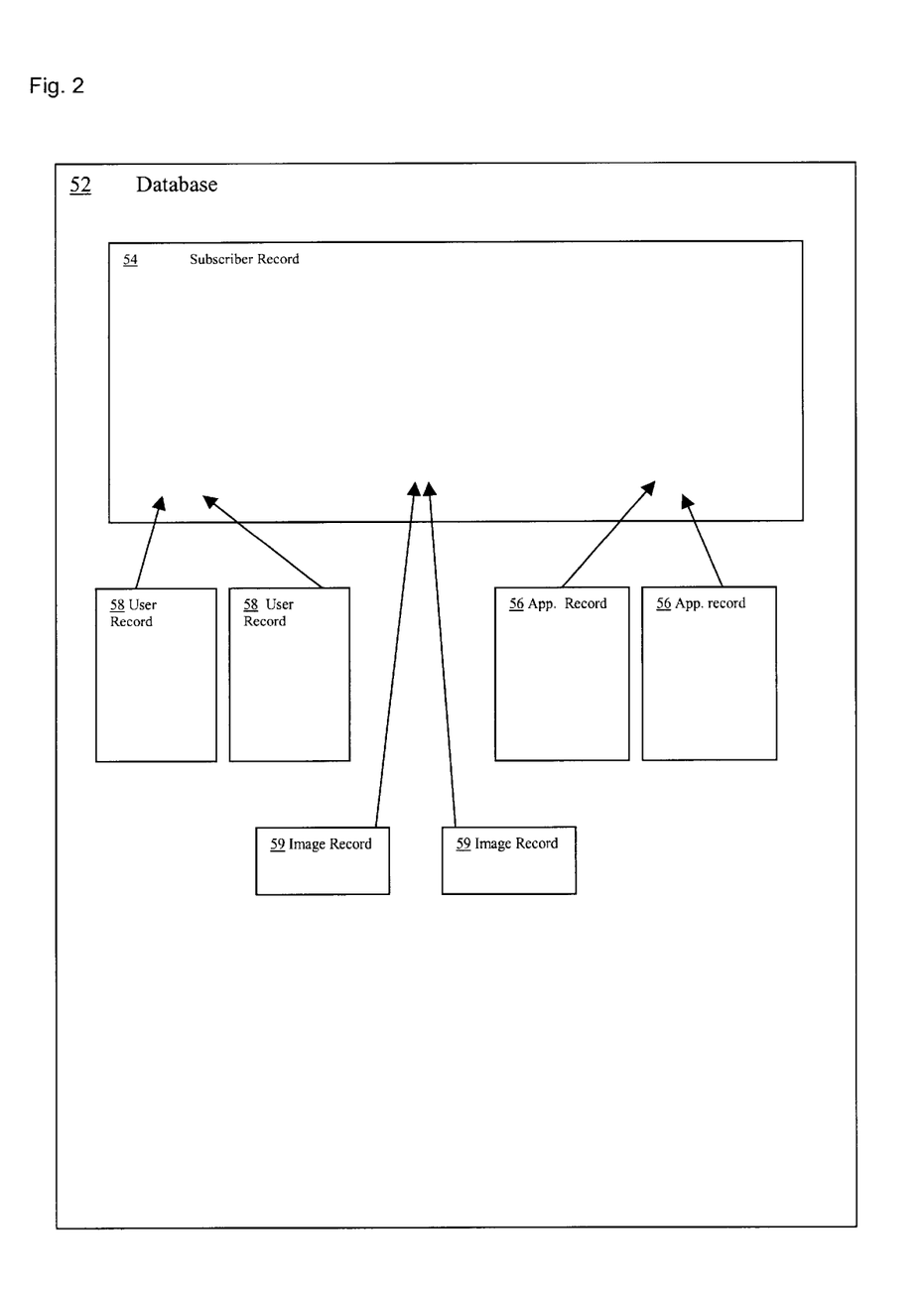
FIG. 2 is a block diagram of the record structure of the database of FIG. 1.

FIG. 2 illustrates an example the records in database 52. Subscribers records 54 include information about the subscriber, appliance records 56 include information about a corresponding remote appliance(s) 30 and user records 58 include information about persons authorized to use local appliance 30. A subscriber in the preferred embodiment is any entity that subscribes to the data transmission service provided. Note that one subscriber can have more than one remote appliance 30 associated therewith. In such a case, plural appliance records 56 can correspond to one subscriber record 54. Each subscriber, for example each billable entity utilizing the decision support service, is assigned a unique subscriber record 54 which can be used by the system as the logical representation of that subscriber. An appliance record 56 is associated with each remote appliance 30. Appliance records 56, and therefore appliances 30, can be associated with to the appropriate subscriber record 54. Further, each individual user is represented by a user record 58. There may be plural users, field technicians for example, for a given subscriber. User records 58 are also associated with a subscriber record. The association may be accomplished in any manner, such as a link, reference, or the like. For example, each appliance record 56 can include a field for the ID of the subscriber associated therewith as will become apparent below. Further, each data set, i.e., images in the preferred embodiment, transmitted by remote appliance 30 in the manner described below can be stored in database 52 as an image record 59 associated with a user record 58 and appliance record 56 corresponding to the user and remote appliance 30 that transmitted the image.

Subscriber records 54 can include a plurality of fields to indicate subscriber identity, billing information, service information, billing information, local appliances 30 and users associated with the subscriber, and the like. Table 1 below lists some possible, but not required, information fields for subscriber records 54 and a description of the variables stored therein.

TABLE 1

| Field Name | Variable Description |
| --- | --- |
| ClientID | A unique master ID for the client |
| ServiceOpt | An indication of a standard service plan for the subscriber |
| ApplianceTotal | The total number of appliances 30 assigned to this subscriber |
| Company | The company name of the subscriber |
| Address | The subscriber's address |
| UploadPar | Upload parameters for subscriber |
| imageindex | Last automatically assigned image counter assigned to subscriber (see description below) |

Appliance record 56 can include a plurality of fields to indicate information about the associated local appliance 30 such as the associated subscriber, packet data information, and the like. Table 2 below lists some possible, but not required, information fields for appliance records 56 and a description of the variables stored therein.

TABLE 2

| Field name | Variable Description |
| --- | --- |
| ClientID | The unique ID of the subscriber associated with the appliance |
| ApplianceID | A unique ID for the appliance |
| UserID | A unique ID of the user assigned to the appliance |
| LTDimages | The total number of data packets received by decision support computer from appliance during current session |
| openImages | The total number of data packets received and reviewed by an expert from appliance during current session. |

User record 58 can include a plurality of fields to indicate information about the user of a local appliance 30 such as the user's name and permissions. Table 3 below lists some possible, but not required, information fields for user records 58 and a description of the variables stored therein.

TABLE 3

| Field name | Variable Description |
| --- | --- |
| ClientID | The unique ID of the subscriber associated with the user |
| UserID | A unique ID for the user |
| UserName | The users name for login purposes |
| Authority | Permissions granted to the user with respect to use of the appliance and images captured thereby. |

Image records 59 can include a plurality of fields to indicate information about images captured and transmitted by a local appliance 30 such as the subscriber ID, the date of capture, textual information relating to an image, and the like. Image records 57 can also include the corresponding image data or a link or pointer to the image data. Each received image is stored in an image record 59 in correspondence to a subscriber ID and index. The index is sequentially and automatically assigned to each image and used as part of a key for the image. The last image index value is stored in subscriber record 54 as described above. Table 4 below lists some possible, but not required, information fields for image records 59 and a description of the variables stored therein.

TABLE 4

| Field name | Variable Description |
| --- | --- |
| ClientID | The unique ID of the subscriber associated with the appliance capturing the image |
| ImageID | An automatically assigned sequential ID for the image based on a stored index in the subscriber record |
| UserID | A unique ID of the user assigned to the appliance creating the image |
| Keywords | Textual information to be associated with the image for classification, searching, or other purposes |
| Comment | Text relating to the image captured on the expert computer or the subscriber computer for communication, such as part identification |
| ThumbNail | A low Affine Transform, or other low resolution form, of the image |
| ApplianceID | The unique ID of the appliance capturing the image |

To avoid consumption of resources by old records, appliance records 56 can be removed when: 1) the appliance properly logs off of decision support computer 50; 2) decision support computer 50 times-out and automatically terminates the appliance log on; or 3) A computer administrator terminates access by the appliance. Session record 53 can be used to maintain access permission. Session records 53 are automatically created via the log on process of decision support computer 50 and are not deleted but are updated to record the present log on and log off status of each local appliance 30. In this way decision support computer 50 can track and report the current status of all local appliances 30. Session record 53 can include conventional session information such as time of log on and log off and activity data and thus is not discussed in greater detail herein.

Expert computer 60 is associated with an expert and includes messaging module 62 for notifying the expert that their expertise is required, for receiving images and other data relating thereto, and for transmitting a response. The term "expert" as used herein refers to any party or parties who can provide a knowledge base with respect to images and other information and may include the subscriber, the service provider, or any other designated party. There can be plural expert computers 60 for each expert. For example, if a party that is an expert travels, the expert computer may include the experts portable computer, handled device (such as a PDA), and desktop personal computer. Accordingly, the term "computer" as used herein refers to any computing device, display device, or combination of one or more such devices. Also, the expert can be plural persons at one location or at plural locations. For example, the expert location can be designated in database records 54 based on the time of day, the type of information, and/or the particular remote appliance 30 from which the information is sent. Examples of experts are discussed in greater detail below.

Subscriber computer 70 is associated with a subscriber to the service and can include messaging module 72 for notifying the subscriber that information has been sent to an expert on their behalf and for receiving images and other data relating thereto. There can be plural subscriber computers 70 for each subscriber. For example, if a party that is a subscriber travels, the subscriber computer may include the subscriber's portable computer, handled device (such as a PDA), and desktop personal computer. Also, the subscriber can be plural persons at one location or at plural locations. Examples of subscribers are discussed in greater detail below. Subscriber computer 70 can also be used to query and/or change information in records 54 corresponding to the subscriber 70 associated with subscriber computer. For example, the subscriber can change the subscriber information, subscriber login information, or information relating to the handling of communications from a particular remote appliance 30 associated with that subscriber as described in greater detail below.

Figure 3:
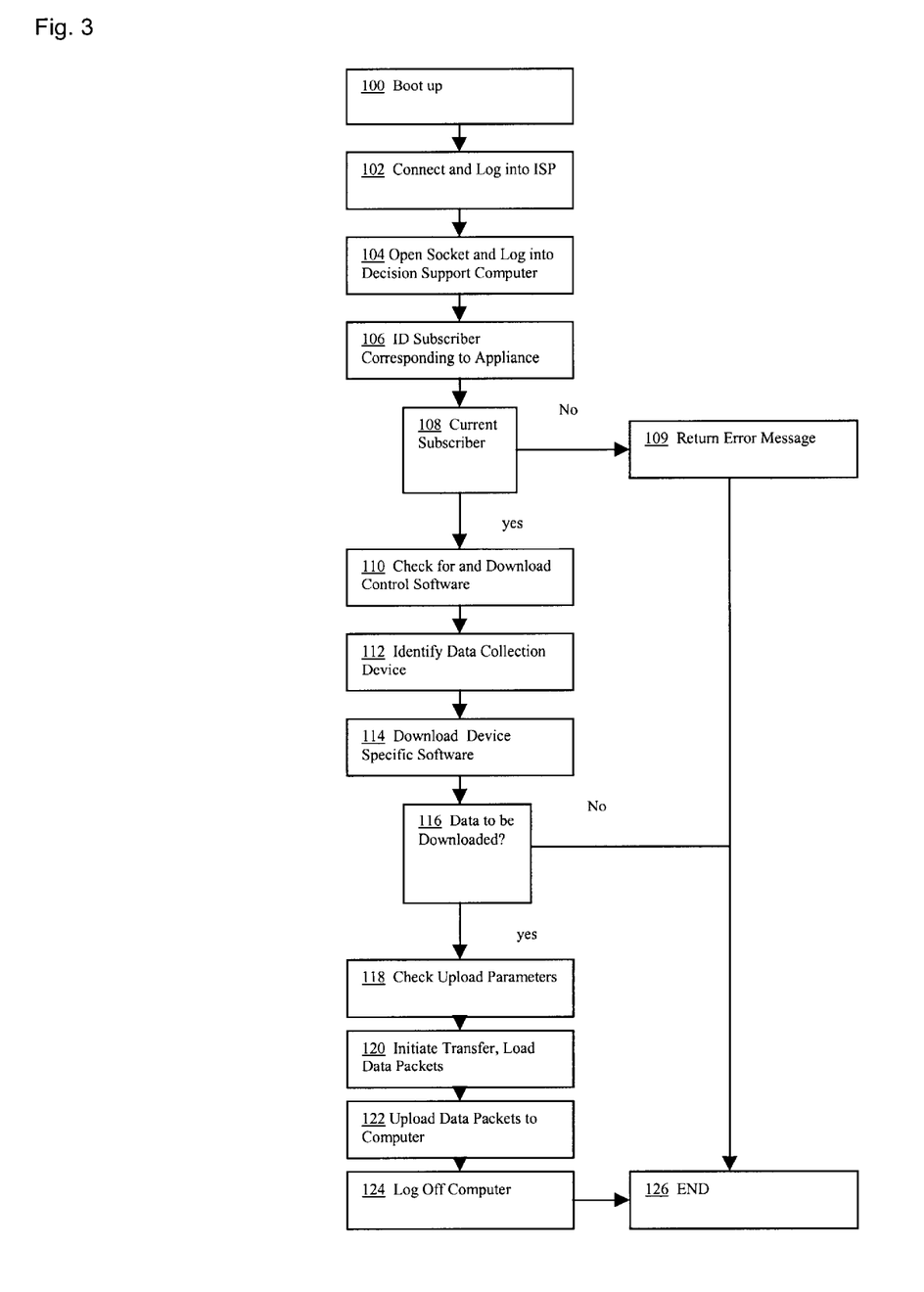
FIG. 3 is a flowchart of the image collection procedure of the embodiment of FIG. 1.

FIG. 3 illustrates the data transfer procedure of remote appliance 30 of the preferred embodiment. When remote appliance 30 is activated, through a triggering event such as depression of a single button or the like, a boot procedure runs from memory of remote appliance 30, such as a read only memory (ROM), in step 100. In step 102, remote appliance 30 connects to, and logs in to, an Internet service provider (ISP), through communication device 40. In step 104, remote appliance 30 opens a socket, i.e. a software object that connects an application to a network protocol, in decision support computer 50 and logs in to decision support computer 50. As noted above, remote appliance 30 has a unique ID. This ID can be stored in remote appliance 30 in ROM or the like, and transmitted to decision support computer 50 during login. In step 106, decision support computer 50 can locate the subscriber record 54 associated with remote appliance 30 by calling up the appliance record 56 corresponding to this appliance ID and then opening the subscriber record 54 associated with the subscriber ID in the appliance record 56.

In step 108, the appropriate subscriber record is queried to see if the subscriber is current, e.g. is current in bill payment for the service, has not requested cancellation, etc. This can be accomplished through a query of a back office accounting system or in any manner. If the subscriber is not current, an error message is generated on a display of remote appliance 30 in step 109, and the procedure advances to step 126 in which the procedure is terminated. If the answer in step 108 is "yes," the procedure continues to step 110 in which any control software stored in memory of remote appliance 30 is checked. For example, the software can be checked for correspondence to the latest version and correspondence to services indicated in the ServiceOpt field of subscriber record 54 and other stored parameters. The control program can be in the form of an executable program or as metadata used to instruct an interpreter in remote appliance 30. In any event, remote appliance 30 sees database 52 as if database 52 is stored on a local memory device of remote appliance 30. In this manner, all data in database 52 is persisted in a virtual manner on remote appliance 30.

If the software is not the current version or otherwise is not proper, the proper control software is downloaded to provide the current version and the proper service functions. Remote appliance 30 can include any operating systems, such as native Java machine, and the control software can be in any appropriate form, such as Java applets or Java beans.

In step 112, data collection device 20, an image capture device in the preferred embodiment, is identified. In the preferred embodiment, the communication "footprint" of data collection device 20 is read by remote appliance 30 and correlated to known data collecting device types through a lookup table stored in remote appliance 30, decision support computer 50, or at some other location. In step 114, any device specific software, such as communication drivers or the like for data collection device 20 are downloaded from decision support computer 50 and loaded into memory of remote appliance 30.

In step 116, image capture device 20 is accessed by local appliance 30 to see if there is any data, image data in the preferred embodiment, to be downloaded. If not, the procedure terminates in step 126. If there is data to be downloaded, upload parameters are ascertained by reading the UploadPar field of the corresponding subscriber record 54. Upload parameters can include any information relating to the uploading of data, such as where the data should be stored, who should be notified of the data upload, the resolution, transfer speed, and data packet size of the upload, and the like. In step 120, the data transfer is initiated by sending a transfer request to decision support computer 50 and data packets are loaded in accordance with the upload parameters. In step 122, the data is uploaded to Decision support computer 50 or another device based on the upload parameters. In step 124, remote appliance 30 logs off of decision support computer 50 and the ISP and terminates the connection. In step 126, the procedure ends.

Figure 4:
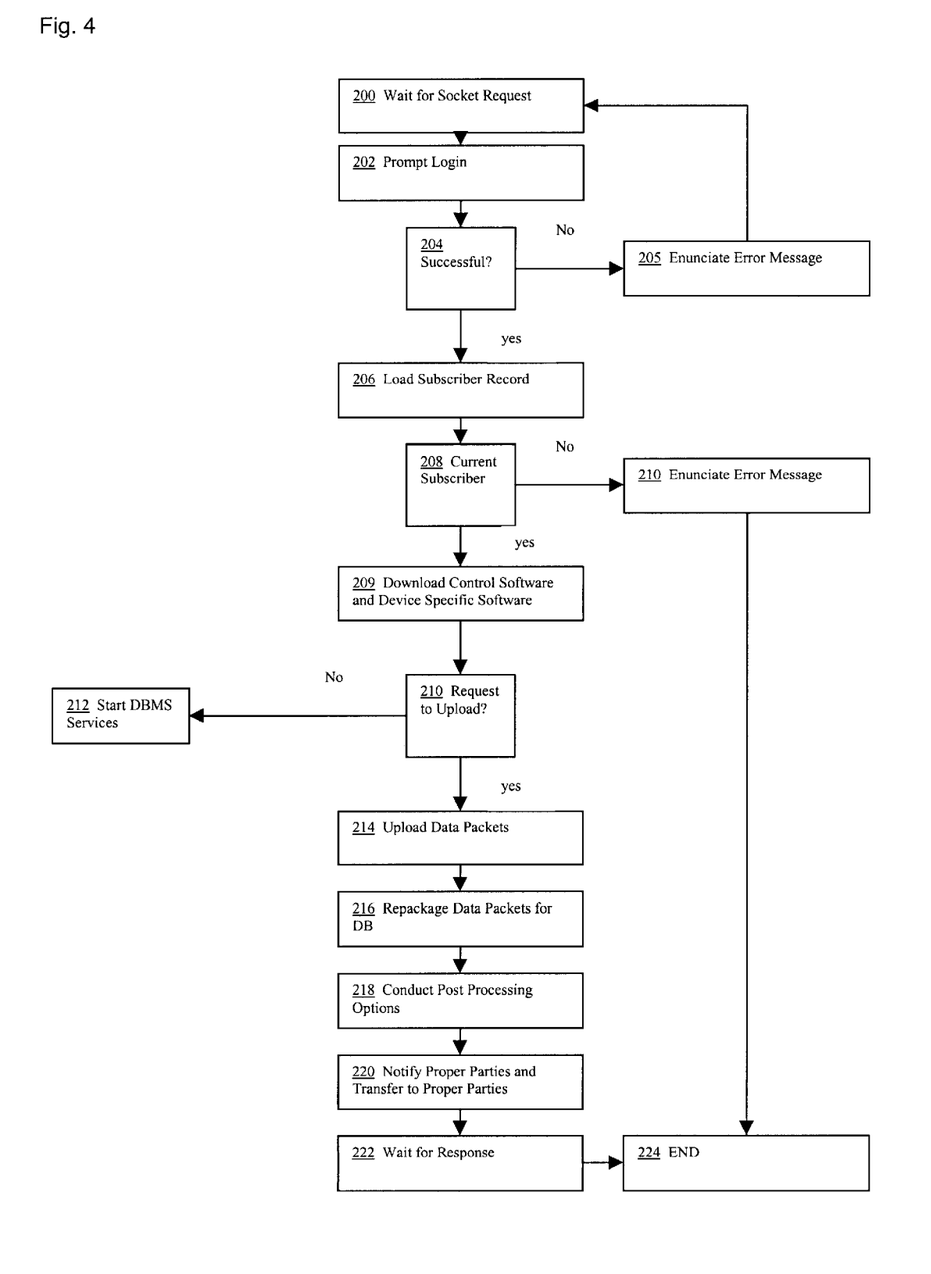
FIG. 4 is a flowchart of the data overall control procedure of the embodiment of FIG. 1.

It is apparent from the description above, that decision support computer includes control logic for controlling the data flow for a data transfer procedure. FIG. 4 is a flow chart of the data flow control procedure of the preferred embodiment. The control procedure runs substantially concurrently with the data transfer procedure discussed above. In step 200 decision support computer 50 waits for a request from local appliance 30, or another device, to open a socket. When such a request is received, decision support computer 50 prompts the device requesting the socket, such as remote appliance 30, to log in as discussed above with respect to step 104 of FIG. 3. Note that the device could be subscriber computer 70 or another device logging in for various reasons. This scenario is discussed below.

If the login is unsuccessful in step 204, an error message is sent to remote appliance 30 or another device requesting log in, in step 205 and the procedure returns to step 200. If the login is successful, subscriber record 54 of the subscriber associated with the logged device, such as remote appliance 30, is loaded in step 206. As noted above, decision support computer 50 can locate the subscriber record 54 associated with remote appliance 30 by calling up the appliance record 56 corresponding to the appliance ID and then opening the subscriber record 54 associated with the subscriber ID in the appliance record 56. In step 208, decision support computer 50 determines if the subscriber is current as described above. If not, an error message is generated in step 210 and the procedure ends in step 224. If the subscriber is current, the above described control software and device specific software is downloaded to remote appliance 30 if appropriate (see steps 110 and 114 of FIG. 3 and the related discussion above). In step 210, decision support computer 50 checks to see if an upload request has been made by remote appliance 30 (see step 120 of FIG. 3 and related description above). If there is not an upload request, the procedure advances to step 212 in which subscriber management services are executed as described below. In other words, if the device that is logged in is not a remote appliance 30, subscriber management functions are presented for reasons which will become clear below.

If an upload request has been received, the data packets are uploaded in step 214. In step 216, the data packets are repackaged for storage in image records 59 database 52 of decision support computer 50. In step 218, any processing options are conducted based on download parameters and/or service options. For example, color correction can be accomplished on the images, the resolution of the images can be changed, affine transforms can be accomplished on the images, the images can be automatically sharpened, brightness or contrast can be corrected, image rotation can be effected, the images can be encrypted or compressed, the images can be converted to black and white, image size can be adjusted, pixel depth can be adjusted, and color depth can be adjusted. In step 220, the appropriate parties are notified of the data transfer. For example, the associated expert may be notified as well as the subscriber. In step 220, the images and other related data, such as keywords and comments are accessed by the expert and other appropriate parties through a browser interface. In step 222, decision support computer awaits a response by the expert, such as parts identification, action instructions, control commands, or the like. The procedure ends in step 224.

As noted above, in the event of a login to decision support computer 50 by subscriber computer 70, subscriber management services can be executed (see step 112 of FIG. 4 and related description). The management services permit the subscriber to change the behavior of the system by editing subscriber records, 54, appliance records 56, user records 58, and image records 59. Of course, certain fields or records may not be able to be edited by the subscriber. For example, the service options, the number of appliances, and the like may be reserved for editing by the service provider to avoid fraud. However, the subscriber may be permitted to change their address, upload parameters, user permissions, and the like. Further, the management services can permit the subscriber to obtain various reports related to activity, billing, and the like. The management services can be executed on subscriber computer 70 as scripts or applets downloaded from decision support computer 50 or in any other manner. For example the management services can be executed in decision support computer 50 and displayed in a browser window on subscriber computer 70.

Figure 5:
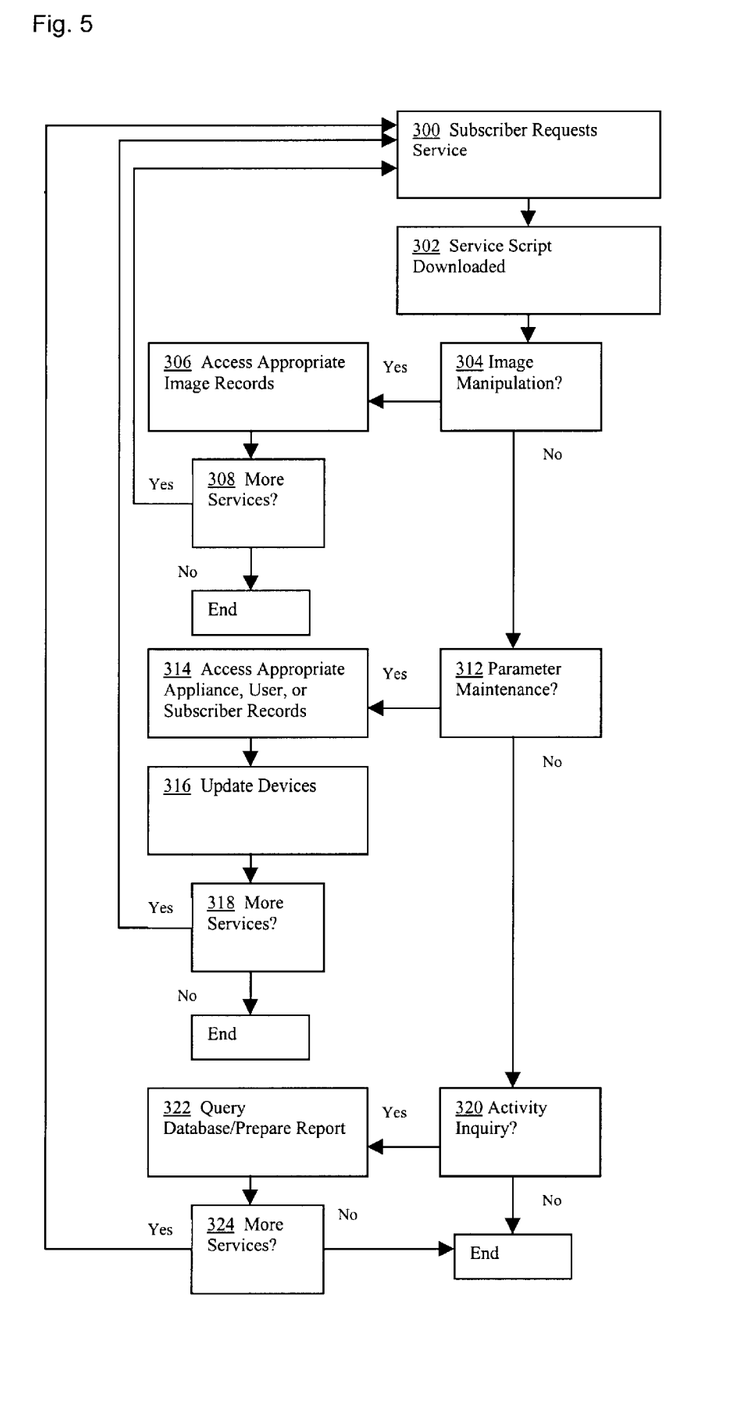
FIG. 5 is a flowchart of the subscribers services procedure of the embodiment of FIG. 1.

FIG. 5 is a flow chart of the subscriber management services of the preferred embodiment. Once it is determined that the login is from subscriber computer 70, the subscriber is presented with a menu selection, or other user interface, for permitting the subscriber to select one of plural management procedures in step 300. For example, the subscriber can be presented with the choice of an activity inquiry, parameter maintenance, or image review/manipulation. Activity inquiries can include queries of database 52 to ascertain field activity, such as how many images have been downloaded, when the images were downloaded, when expert review has been completed, how a remote device has been controlled, or any other activity information stored in database 52. Parameter maintenance refers to reviewing and/or modifying the values of fields in subscriber records 54, user records 58, and appliance records 56 to the extent permissible by the system. As noted above, it is possible that certain fields cannot be changed by the subscriber. Further, the subscriber will only be given permissions to view/modify records relating to the subscriber's account, as opposed to accounts of other subscribers. Image manipulation refers to the viewing, processing, and editing of images in image records 59 corresponding to the subscriber.

In step 302, software scripts or other software are downloaded to subscriber computer 70 to execute the requested services. For example, the software can be in the form of Java applets. In step 304, it is determined whether or not the subscriber requested image manipulation. If so, the procedure goes to step 306 and the user is presented with an image manipulation interface for accessing, modifying, or processing images in image records corresponding to the subscriber.

Standard image manipulation and processing tools can be used. For example, Affine transforms, color correction, or the like, can be accomplished on the images in a known manner. In step 308, if it is determined if there are more services desired by the subscriber by presenting the subscriber with a menu or the like. If so, the procedure returns to step 300 for the subscriber to request more services. If there are not more services desired, the procedure ends.

If image manipulation has not been requested, the procedure advances from step 304 directly to step 312 in which is it decided if the subscriber has requested parameter maintenance. Parameter maintenance can include viewing and editing any of the permissible values in subscriber record 54, user records, 58, and appliance records 56 corresponding to the subscriber. Based on the description of these records above, it can be seen that the behavior of the system can be adjusted in plural ways merely by changing the parameters in the appropriate fields of these records. As an example, upload parameters can be changed by editing the UploadPar field of subscriber record 54. A standard database editing tool can be used for parameter maintenance. Assuming that parameter maintenance has been selected, the appropriate records are accessed and modified using the tools in step 314. Subsequently, any devices are updated in a corresponding manner in step 316. For example, a change in upload parameters may require updating of client software in remote appliance 30 or in expert computer 60. Alternatively, a service request change may require updating records in a back office system of the service provider. If more services are requested, the procedure returns to step 300 and, if not, the procedure ends. If, in step 312, it is determined that parameter maintenance has not be requested, the procedure advances to step 320 in which it is determined if an activity inquiry has been requested. If so, database 52 is queried and a report is generated in step 322. Standard query tools and report generation tools can be utilized. Step 324 determines if more services have been requested and, if not, the procedure ends. If additional services have been requested, the procedure returns to step 300.

The preferred embodiment permits a subscriber to predetermine data collection and distribution to facilitate expert review. For example, image data of plumbing parts can be automatically sent to an expert in a predetermined manner and the expert can provide knowledge and communicate the same to the subscriber. The field technician operating the data collection device does not need to specify any addresses or parameters for communication. All systems behavior can be controlled by the subscribers and service provides. The operator of the remote appliance need not configure any parameters.

The invention can be used to collect and transmit any type of information for which expert review may be desirable. For example, the information can be video images, still images, process control data or the like. The triggering event for causing data transmission can be any event that is deemed appropriate for initiating data transmission. Further, The expert can be any person or device that is used to analyze, view, or process the data. For example, The remote appliance can be coupled to a video camera located near an area to be monitored for activity and the video data can be transmitted upon a triggering event such as detection of movement, opening of an entrance door, or the like. Known sensing techniques can be used to detect the triggering event. The remote appliance can also be coupled a sensor of a process control system and can transmit process variables upon a triggering event such as when the variable exceeds an alarm limit or other threshold value. The remote appliance can control other devices, such as a camera panning device or process controller, based on the control program downloaded from the decision support computer. For example. The control program can be operative to transfer operating commands from decision support computer 50 to the device.

The invention can be applied in any type of decision support system in which data can be transmitted to assist the decision. For example, the invention can be implemented in a roadside vehicle service system. Data collection device 20 can be a diagnostic device that connects to the vehicle diagnostic port. Remote appliance 30 can determine the type of diagnostic device as described above and can transmit diagnostic data to a technician at a remote location. The technician, having access to the vehicle on-board computer, could make diagnostic adjustments from the remote location. Vehicle service centers can use such an implementation to collaborate expertise between technicians at various locations.

The invention can be applied to the monitoring of computer networks or other systems or processes. For example, remote appliance 30 can be coupled to plural sensors as data collection devices 20. Periodically, remote appliance 30 can log onto decision support computer 50 and download the latest monitoring and diagnostic criteria or process parameters. One such process is the use of portable telecommunications equipment used by disaster response teams and military units. Set up, use, and tear down, can be monitored guided and optimized by a remote team of specialists.

Equipment maintenance can be improved through use of the invention to collect equipment operating status information. For example, an engine running in dusty conditions will require replacement of air filters more often than one run in standard conditions. Existing on- board fuel/air mixture sensors can be used as the data collection device and the trend in automatic adjustments made can be compared to a standard to produce and expected air filter life.

Using the invention, in-field service technicians can act as the "portable eyes and hands" for more experienced centralized experts, such as engineers. The experts can see and hear actual events, and view collected data, in real time. This can facilitate repair of remote equipment, such as emergency roadside transceiver stations.

Further, the invention can be used for dynamic remote control of devices in a collaborative manner. For example, in field surgery, the skill of a surgeon can be deployed from a remote location using specialized robotics incorporated into the remote appliance 30. The robotics can be controlled using known virtual reality controls at the remote location to send operating commands through the local appliance. Tactile feed back can be synthesized to the surgeon. Plural surgical specialists, at various remote locations could collaborate to operate on a single patient near the local appliance. Also, the invention can be similarly applied to delivering the expertise of various medical practitioners, located at remote locations, to local patients.

Devices for monitoring the use and location of various physical assets, such as plant machinery, can be coupled to remote appliance 30 and the invention can be used to monitor the physical and functional condition of the equipment. The collected data can be used for analysis of the conditions.

The invention facilitates "best foot forward" service and skill. This would reduce costly errors. For example in the case of a company in the business of buying other companies technology infrastructure and then leasing them back to the same company. The due diligence teams of each party now have to make a best guess or hope that they have gathered the appropriate information to ascertain the asset value and condition. A "bricks and mortar" audit associated with plant facilities could be reviewed by a single person. In place of written reports, the fielded staff member would press a button and be connected directly to a centralized team through remote appliance 30. It would not matter where the field staff happened to be when the button was pressed.

The invention can be used as any type of remote diagnostic tool. Diagnostic technicians at a central location that is equipped with the best possible diagnostic tools could be literally attached to a machine needing diagnostics via the local appliance. Diagnostic technicians would be able to perform virtually all of the same diagnostic procedures that would have been correct had the machine been returned to the factory for service.

The invention can be used for training. In cases where it is now necessary to have either staff from to be trained or training staff to travel. Or, in cases where current telephone support is insufficient. The remote appliance could be sold or rented to an organization in need of training or support. This would allow existing staff or slightly less experienced staff to handle higher value training. For example, in electronics manufacture a "pick and place" machine is very expensive, and even in the case where there are multiple installations, the availability of quality on-site training, re-training, or support is often low. Companies now operating these machines and relying on staff that had to be shipped off to training exposes the company to production interruption in the event of staff loss, or increased operating cost due to the trained staff having a monopoly on the expensive skill. The up-time value of the machine could be improved by reducing the effect of staff turnover in smaller lines, and help control operating costs by removing the perceived monopoly of skill from previously trained staff.

In the case of repair or rehab work, the conditions present for the task at hand can have as much effect on the actual cost as any other variable. For this reason it is essential to reconnoiter the site (in the case of re-construction) or the equipment to be re-worked. There are many cases where the costs associated with getting to see the task is prohibitive without some understanding of the potential cost exposure. In these cases, the invention can be applied to send a small, wireless, hand-held remote appliance to the location of the job or equipment allowing the estimator first hand account of the conditions precedent.

Another example of an application of the invention is insurance sales. Normally insurance sales and other staff could be pressed into service to appraise the value of insured losses. Sales staff whom already have easy physical access to their own clients as well as their normal support staff, would only need to have been issued a remote appliance which they would be able to carry to a field location or the like. Experienced appraisal staff could then use the transmitted data to guide the field staff's efforts using both sound and pictures. For example the appraiser might tell the support staff now at an accident scene, to hold the camera underneath the bumper of a car being shown. More rapid claims processing will increase customer satisfaction and simultaneously reduce the costs associated with claims processing. In addition the "immediate nature" provided by the invention will help to eliminate false claims helping the underwritten to cover only those expenses that are truly due to the insured loss event. The experience of the claims adjuster at a remote location can be brought to bear on the actual scene of the accident. Also legal claims would be better supported with live information collected by the insurance company at the actual scene.

Additionally, the invention can be used to aid paramedics and other emergency personnel. The remote appliance can stationed in public service vehicles and company infirmaries. In the event of an emergency, the skills of paramedics or other personnel at remote locations could be extended into the field. Accordingly, the right expertise can be brought to the emergency location quickly to increase survival rates and recovery time. A police car, for example, equipped with the remote appliance could respond as a paramedic by utilizing the paramedic expertise from a remote location.

Further, on-site news reporting, long the exclusive domain of the financially stronger media companies, can begin to be shared by much lower budget organizations by providing the local appliance to reporters in the field. The reduced costs of data acquisition will allow smaller organizations to share in greater coverage. A single reporter having a remote appliance could be dispatched from any of the local media organizations or schools that happened to be in very close proximity, and still use a recognized anchor available elsewhere as the expert.

In the case of market research, the field people that are responsible for collecting the information are put at a disadvantage by the "bias" of the pre-defined research questions. In many cases, the best the product manager can hope for is recorded "typified responses" selected by the research team. In this example, the field researcher would only have to press a single button on the local appliance and instant wireless web based access would be engaged. The field researcher would not need to have communications capability, or be physically present in a cell phone cell. Using satellite or other wireless communication systems, the researcher could be anywhere in the world. Value can be added by allowing the product managers, as the experts, to have a live dialog with research prospects that the field team deems as "typical". Products could be better tailored for the market for which they are meant to be consumed.

There are also agricultural applications for the invention. An inexpensive fast insect identification system that can also double as an animal diagnostic double check. Agricultural services could use the local appliance as an instrument that would allow anyone to go in field to find samples of potential pests. The determination that the insect is benign, helpful or dangerous could be made more reliably before a dangerous insect gets out of hand. Anyone, regardless of skill, could be pressed into service by simply carrying the local appliance. The person need only press a button and would instantly be sending information onto a pre-determined site for expert review.

In today's fast Internet based economy, sales of singular items are still recorded using a still camera and then manually transferred into a suitable form for inclusion in publications both on and off of the Web. The local appliance can be used to make placements available on the Web (and for inclusion in the printed publication) virtually instantly. For example, a real estate broker attempting to sell a homeowner on listing with that real-estate sales firm, could demonstrate, in real time, the effect of the home's presence on the web.

It can be seen that the invention permits a virtual remote presence server to be established at any location for any purpose. The invention can be implemented on any device, such as a personal computer, server, or any other general purpose programmable computer or combination of such devices, such as a network of computers. Communication can be accomplished through any channel, such as a local area network (LAN), the Internet, serial communications ports, and the like. The communications channels can use wireless technology, such as radio frequency or infra-red technology. The various elements of the preferred embodiment are segregated by function for the purpose of clarity. However, the various elements can be combined into one device or segregated in a different manner. For example, software can be a single executable file and data files, or plural files or modules stored on the same device or on different devices. Also the data collection device and remote appliance can be integrated into a single device.

The devices can be a single device, such as a computer, or plural devices, such as a network of computers. Accordingly, the term "computer" as used herein refers to any type of computing device, or combination of such devices, capable of exhibiting the associated function. Any protocols, data types, or data structures can be used in accordance with the invention. The invention can be used to transmit any type of data and to facilitate any type of expert review. The underlying code can be written in any language, such as Java, C++, or the like.

The invention has been described through a preferred embodiment. However, various modifications can be made without departing from the scope of the invention as defined by the appended claims and legal equivalents thereof.

What is claimed:

1. A method for transmitting collected data from a remote location to a designated device, said method on server comprising:
   recording subscriber information indicating an identity of a subscriber, one or more remote appliances associated the subscriber, and characteristics of a data transport connection desired by the subscriber;
   establishing communications with a remote appliance based on the characteristics of the data transport specified;
   receiving captured data collected at a remote location by a remote appliance with at least one data collection device coupled thereto, wherein the remote appliance automatically identifies the data collection device by analyzing one or more output signatures of the data collection device; and
   transmitting the captured data to at least one designated device based on the subscriber information previously associated with the remote appliance.

2. A method as recited in claim 1, wherein the receiving captured data comprises receiving captured data a collected at a remote location by the remote appliance with at least one data collection device coupled therewith via a wireless connection.

3. A method as recited in claim 2, wherein said data collection device and said remote appliance are integrated into one device.

4. A method as recited in claim 2, wherein the data collection device and the remote appliance are separate devices.

5. A method as recited in claim 2, wherein the receiving collected data by the remote appliance comprises automatically identifying the data collection device used to collect the data by sending an appropriate interface into the remote appliance based on the one or more output signatures.

6. The method recited in claim 5, further comprising recording appliance information including an indication of the subscriber information corresponding to the remote appliance.

7. The method as recited in claim 6, further comprising recording user information including an indication of the appliance information corresponding a user authorized to use the remote appliance.

8. The method as recited in claim 6, wherein said step of recording subscriber information comprises recording a subscriber record having a unique ID corresponding to the subscriber and wherein the appliance information includes the unique ID.

9. The method as recited in claim 7, wherein said step of recording subscriber information comprises recording a subscriber record having a unique ID corresponding to the subscriber and wherein the user information includes the unique ID.

10. The method as recited in claim 1, further comprising the step of processing the captured data in accordance with the subscriber information.

11. The method as recited in claim 1, wherein the captured data is image data.

12. The method as recited in claim 1, wherein the captured data is process parameter data.

13. The method as recited in claim 1, wherein the captured data is equipment operating status information.

14. The method as recited in claim 1, wherein the transmitting the captured data to at least one designated device further comprising transmitting the captured data for evaluating the captured data using expert knowledge from a location of the data collection device.

15. The method recited in claim 14, further comprising transmitting operating commands to the location in response to the captured data transmitted in said transmitting step.

16. A server based appliance for transmitting data from a remote location to a designated device, said appliance comprising:
    means for reading subscriber information indicating an identity of a subscriber associated with the remote appliance and characteristics of data transport connection desired by the subscriber;
    means for establishing communications with a remote appliance based on the characteristics of the data transport specified;
    means for receiving the captured data collected at a remote location by a remote appliance, wherein the remote appliance automatically identifies at least one data collection device coupled thereto, by analyzing one or more output signatures of the data collection device; and
    means for transmitting the captured data to at least one designated device based on the subscriber information previously associated with the remote appliance.

17. An appliance as recited in claim 16, wherein said means for receiving captured data collected at the remote location by the remote appliance includes receiving collected data by the remote appliance comprises automatically identifying the data collection device by sending an appropriate interface into the remote appliance based on the one or more output signatures.

18. The appliance as recited in claim 16, wherein the collected data is image data.

19. The appliance as recited in claim 16, wherein the collected data is process parameter data.

20. The appliance as recited in claim 16, wherein the collected data is equipment operating status information.

21. The appliance as recited in claim 20, wherein the means for transmitting the captured data to at least one designated device further comprises means for transmitting the captured data for evaluating the captured data using expert knowledge from a location of the data collection device.

* * * * *